United States Patent [19]
Schlachter et al.

[11] Patent Number: 5,418,822
[45] Date of Patent: May 23, 1995

[54] CONFIGURATION FOR CLOCK RECOVERY

[75] Inventors: Hans-Heiner Schlachter, Neureid; Wanjo Damianoff, Deggendorf, both of Germany

[73] Assignee: Siemens Aktiengesellschaft, Munich, Germany

[21] Appl. No.: 123,523

[22] Filed: Sep. 17, 1993

[30] Foreign Application Priority Data

Sep. 17, 1992 [DE] Germany .......... 42 31 175.6

[51] Int. Cl.⁶ .................................... H04L 7/02
[52] U.S. Cl. ................. 375/354; 327/156; 327/141; 327/291; 331/57; 326/93
[58] Field of Search ........... 375/106, 110, 118–120; 370/100.1, 108; 307/480, 269, 590, 597; 328/63, 72, 155; 331/57

[56] References Cited

U.S. PATENT DOCUMENTS

| | | | |
|---|---|---|---|
| 3,626,298 | 12/1971 | Paine | 375/110 |
| 3,982,195 | 9/1976 | Turner | 375/84 |
| 4,464,771 | 8/1984 | Sorensen | 328/63 |
| 4,803,705 | 2/1989 | Gillingham et al. | 375/120 |
| 4,849,704 | 7/1989 | Thornton | 375/120 |
| 4,984,255 | 1/1991 | Davis et al. | 375/106 |
| 5,012,494 | 4/1991 | Lai et al. | 375/120 |
| 5,299,237 | 3/1994 | Head | 375/120 |

FOREIGN PATENT DOCUMENTS

| | | |
|---|---|---|
| 316607 | 5/1989 | European Pat. Off. . |
| 3515542 | 11/1986 | Germany . |
| 3728022 | 3/1988 | Germany . |
| 3543826 | 8/1992 | Germany . |

OTHER PUBLICATIONS

Patent Abstract of Japan Publ. No. JP 3076446, (Yoshida Hiroshi), Jun. 21, 1991.
IBM Technical Disclosure Bulletin No. 10, Mar. 1987, pp. 4427–4428, "Clock Recovery Phase-Locked Loop".
Mihai Banu, (IEEE) "MOS Oscillators with Multi-Decade Tuning Range and Gigahertz Maximum Speed".

*Primary Examiner*—Stephen Chin
*Assistant Examiner*—Young Tse
*Attorney, Agent, or Firm*—Herbert L. Lerner; Laurence A. Greenberg

[57] ABSTRACT

A configuration generates a clock signal from a digital signal by evaluating signal edges of the digital signal. A first device generates a pulse at a signal edge oriented in a first direction, and a second device generates a pulse at a signal edge oriented in a second direction being opposite the first direction. Each of the devices has one terminal for receiving a digital signal and one output. A voltage-controlled, triggerable oscillator device has at least two trigger inputs, one control input and one output. Each of the trigger inputs is connected to the output of a respective one of the first and second devices, and the output of the oscillator device is an output for the clock signal. An integration device has an input connected to the output of the oscillator device and has an output connected to the control input of the oscillator device.

9 Claims, 2 Drawing Sheets

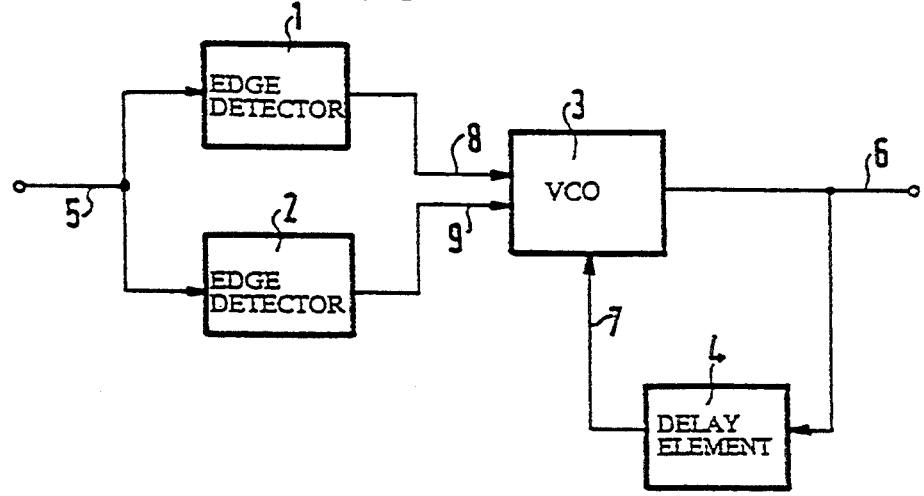
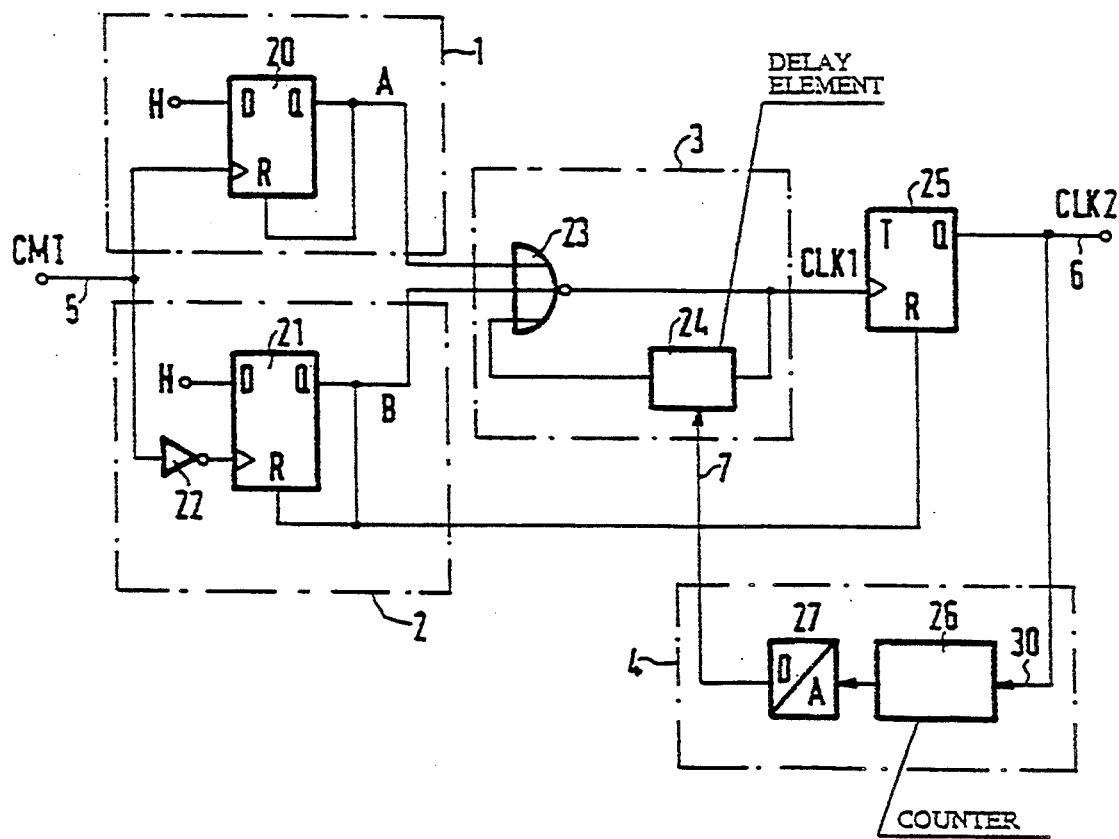

CONFIGURATION FOR CLOCK RECOVERY

BACKGROUND OF THE INVENTION

1. Field of the Invention

The invention relates to a configuration for generating a clock signal from a digital signal by evaluating signal edges of the digital signal.

In digital signals, the logical values L and H are represented by different signal levels. A change in signal levels is carried out synchronously with a clock. In general, a signal level change does not occur upon each clock edge, so that the data clock cannot be detected directly from the digital signal. Due to delays, for instance during signal transmission or signal processing, the phase relationship and instantaneous frequency of the digital signal vary. However, processing the signal at the correct time in a digital signal processing apparatus requires a clock signal that has the same frequency, or a multiple of the instantaneous frequency of the digital signal, and has a fixed phase relationship with it.

German Published, Non-Prosecuted Application DE 35 15 542 A1 discloses a configuration for generating a clock signal from a digital signal by evaluating the signal edges of the digital signal. A signal at the frequency of the digital signal is already present. Only a readjustment of the phase is performed, in a digital control loop.

German Patent DE 35 43 826 C2 discloses a phase-locked loop that generates a frequency-coupled and phase-coupled output signal for a digital input signal. It uses a voltage-controlled but not triggerable oscillator, a phase detector, and a low-pass filter for that purpose. German Published, Non-Prosecuted Application DE 37 28 022 A1, corresponding to U.S. Pat. No. 4,803,705, shows a further phase-locked loop, which includes a voltage-controlled, non-triggerable oscillator, as well as a phase detector and a frequency detector.

2. Summary of the Invention

It is accordingly an object of the invention to provide a configuration for clock recovery, which overcomes the hereinafore-mentioned disadvantages of the heretofore-known devices of this general type and which generates a clock signal from a digital signal that is coupled to the phase and the frequency of the digital signal.

With the foregoing and other objects in view there is provided, in accordance with the invention, a configuration for generating a clock signal from a digital signal by evaluating signal edges of the digital signal, comprising first means for generating a pulse at a signal edge oriented in a first direction, and second means for generating a pulse at a signal edge oriented in a second direction being opposite the first direction, each of the means having one terminal for receiving a digital signal and one output; a voltage-controlled, triggerable oscillator device having at least two trigger inputs, one control input and one output, each of the trigger inputs being connected to the output of a respective one of the first and second means, and the output of the oscillator device being an output for a clock signal; and an integration device having an input connected to the output of the oscillator device and having an output connected to the control input of the oscillator device.

In accordance with another feature of the invention, each of the means include one D flip-flop having an output being fed back to a reset input, a clock input being connected to the terminal for the digital signal and a data input being controlled by a logical level, and one of the means having an inverter connected between the clock input and the terminal for the digital signal.

In accordance with a further feature of the invention, the oscillator device is a ring oscillator including a delay device having an adjustable delay time and having an output being fed back inverted to an input, and the ring oscillator includes an NOR gate having an output being connected to the input of the delay device and to the output of the oscillator device and having inputs being connected to the output of the delay device and to the trigger inputs of the oscillator device.

In accordance with an added feature of the invention, the delay device includes a series circuit of at least one delay element having a fixed delay time and at least one delay element having an adjustable delay time.

In accordance with an additional feature of the invention, there is provided a divider device having an input connected to the output of the oscillator device and an output connected to the output for the clock signal.

In accordance with yet another feature of the invention, the divider device has a reset input connected to the output of one of the means.

In accordance with yet a further feature of the invention, the integration device is an analog resistor capacitor configuration.

In accordance with a concomitant feature of the invention, the integration device includes an up-down counter having a control input for a switchover between up and down counting being connected to the output for the clock signal and having an output, and the integration device includes a digital/analog converter being connected downstream of the output of the counter and having an output being the output of the integration device.

Other features which are considered as characteristic for the invention are set forth in the appended claims.

Although the invention is illustrated and described herein as embodied in a configuration for clock recovery, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block circuit diagram of a configuration for clock recovery according to the invention;

FIG. 2 is a schematic circuit diagram of a version of the configuration of FIG. 1;

DESCRIPTION OF THE PREFERRED EMBODIMENTS

Figure 3:
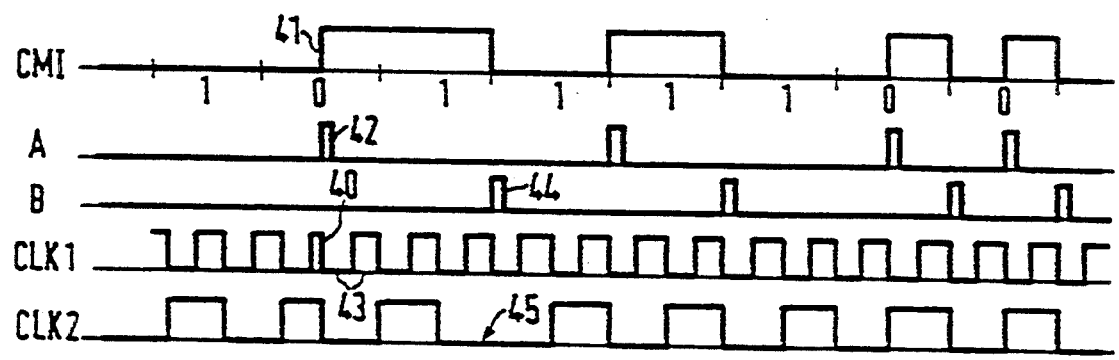
FIG. 3 is a clock signal diagram for the configuration of FIG. 2.

Referring now in detail to the figures of the drawings, in which identical elements in different figures are provided with the same reference numerals, and first, particularly, to FIG. 1 thereof, there are seen first and second means 1, 2, to which a digital signal present at an input 5 of the configuration is delivered. The means 1 generates a pulse at a positive signal edge of the digital signal, and the means 2 does so at a negative signal edge. An oscillator device 3 generates a clock signal having a frequency which is adjustable by means of an analog signal present at a control input 7. The phase relationship of the clock signal generated by the device 3 can be regulated through trigger inputs 8, 9. To that end, the inputs 8, 9 are connected to outputs of the means 1, 2. An output of the voltage-controlled, triggerable oscillator device 3 is connected to an output terminal 6 of the configuration. The terminal 6 is carried to an integration device 4 with which the output clock signal is integrated. The integration can be performed in a digital or analog manner. An output of the device 4 carries an analog control signal, with which the oscillator frequency is followed up at the terminal 7 of the oscillator device 3.

Through the use of the means 1, 2, both a positive and a negative data signal edge are evaluated. The clock signal generated in the voltage-controlled oscillator 3 is triggered with the pulses generated by the means 1, 2. The oscillator device 3 must therefore synchronize either to twice the data signal frequency, or to an integral multiple of twice the data signal frequency. If the single data signal frequency is needed at the output 6, then a divider is connected between the output 6 and the output of the oscillator device 3. The clock signal generated by the oscillator device 3 is integrated either directly or after a possible frequency division in the integration device 4. The time constant of the integration device is high as compared with a clock period of the clock signal being generated. The oscillator device 3 and the integration device 4 form a closed loop. The closed loop is adapted in such a way that when the duty factor of the clock signal is imbalanced, the frequency of the oscillator device 3 is readjusted through its control input 7 with the output signal of the integration device 4 until such time as the clock signal has a duty factor of 1:1. The configuration according to the invention accordingly produces a clock signal that is synchronous in both frequency and phase with the clock signal that is fundamental to the data in the digital signal.

FIG. 2 shows one embodiment of the configuration according to the invention shown in FIG. 1. The mode of operation will be explained by taking a CMI (coded modulated information) data signal as an example, in conjunction with the level diagram of FIG. 3. The CMI code is used in digital data transmission in order to transmit both the data information and the clock information in a single signal. A logical L value is transmitted as the data clock and logical H values are transmitted as an alternating train of L and H levels. The signal CMI present at the input 5 of the configuration accordingly is assumed to have a data train 1-0-1-1-1-0-0.

The means 1 for differentiating a positive data signal change includes a D flip-flop 20, having an output Q which is fed back to a reset input R. The data input of the D flip-flop 20 is set to H. A clock input is connected to the terminal 5. The means 2 for differentiating a negative data signal edge includes a D flip-flop 21, which is wired accordingly. The difference from the D flip-flop 20 is that a clock input is connected to the terminal 5 through an inverter 22. The D flip-flop 20 stores the H level present at its data input whenever the level of the signal CMI changes from L to H. An H level is present at the output Q until such time as the flip-flop is reset to L by this signal through the feedback to the reset input. The pulse width corresponds to the signal delay from the reset input R to the output Q. A signal A present at the output Q of the D flip-flop 20 is shown in FIG. 3. The inverted CMI signal is delivered to the D flip-flop 21. A signal B at the output Q of the D flip-flop 21 accordingly generates a pulse at a negative data signal edge.

The outputs of the D flip-flops 20, 21 are connected to trigger inputs of the voltage-controlled, triggerable oscillator device 3. The oscillator device 3 is a ring oscillator with a delay element 24, having an output which is fed back inverted to its input. The delay time of the delay element 24 can be set or adjusted through an analog signal applied to its control input 7. Preferably, the delay element 24 is constructed in accordance with one of the basic circuits shown in Published European Application No. 0 316 607. A NOR gate 23 is incorporated into the feedback path of the delay element and has one input connected to the output of the delay element 24 and two further inputs connected to the outputs of the D flip-flops 20, 21. An output of the NOR gate 23 forms the output of the oscillator device 3 is connected to the input of the delay element 24.

The frequency of the oscillator device 3 is adjusted through the delay time of the delay element 24. Through the use of the signals A, B present at the trigger inputs, a clock signal CLK1 generated by the oscillator device 3 is set to L upon each positive and negative data signal edge. In this way, the clock signal CLK1 is synchronized to each positive and negative data signal edge. This is shown at a point 40 in FIG. 3: before an edge 41 of the signal CMI, the clock signal CLK1 was phase-displaced relative to the signal CMI. Through the use of a pulse 42, the H clock segment of the clock signal CLK1 is shortened, and the clock signal is synchronized with the edge 41. L and H phases 43 of the clock signal CLK1 are determined by the delay time of the delay element 24. If the frequency of the signal CMI changes, for instance due to interference during signal transmission, then subsequent edges of the signal CMI are phase-displaced from the clock signal CLK1. The synchronization of the clock signal CLK1 to the corresponding edge of the signal CMI takes place in a corresponding way. The delay time of the delay element 24 is set in such a way that the clock signal CLK1 is equivalent to twice, or a multiple of twice, the frequency of the data fundamental to the signal CMI, so that the synchronization can be done to both the leading and the trailing data signal edges.

The signal CLK1 in the exemplary embodiment of FIG. 2 is carried to a clock input of a divider device 25. Through the use of the device 25, which is in the form of a toggle flip-flop, the frequency of the clock signal CLK1 is divided in half. A reset input R of the toggle flip-flop 25 is connected to the output of the D flip-flop 21. Through the use of a pulse 44 of the signal B, the toggle flip-flop 25 is reset to L (at a point 45 in FIG. 3). As a result, the phase relationship of an output signal CLK2 at the output 6 to the data clock of the signal CMI is fixed at 0° or 180°. In the present case, the resultant phase difference is zero. If the reset input of the toggle flip-flop 25 were connected to the output of the D flip-flop 20, a phase relationship of 180° would be established.

The integration device 4 in the exemplary embodiment of FIG. 2 has an up-down counter 26, with an output signal which is converted to an analog signal in a digital/analog converter 27. An output of the converter 27 is connected to the control input 7 of the delay element 24. One input 30 of the counter 26 is connected to the output of the toggle flip-flop 25 and serves to make a switchover from up to down counting and vice versa. It is also possible for the integration device 4 to be constructed in a purely analog version, for instance as a resistor capacitor configuration (RC element). Triggering of the RC element may be done through a differential amplifier that is controlled by the clock signal CLK2.

The clock signal CLK2 is integrated by the integration device 4. If the duty factor is balanced, the integration device 4 generates a mean level value, which fails to be attained, or is exceeded, if the duty factor is shifted. Through the use of the output signal, the delay time of the adjusting element 24 is readjusted, so that the duty factor of the clock signal CLK2 is balanced. The clock signals CLK1, CLK2 being generated are thus symmetrical in the steady state.

An advantage of the embodiment of the configuration according to the invention as shown in FIG. 2 is that particularly when the delay element 24 is constructed as described above, the entire configuration can be constructed as a circuit without external components that is integratable on a single common mode logic semiconductor chip. The configuration utilizes both positive and the negative clock signal edges of the input signal for clock recovery and additionally assures a symmetrical duty factor.

It is also conceivable to use signals that generate a negative pulse, instead of the signals A, B which generate a positive pulse. This requires placing the data inputs of the D flip-flops 20, 21 at an L level and feeding back the outputs to the set input of the D flip-flop. In that case a NAND gate should be used instead of the NOR gate 23.

Figure 4:
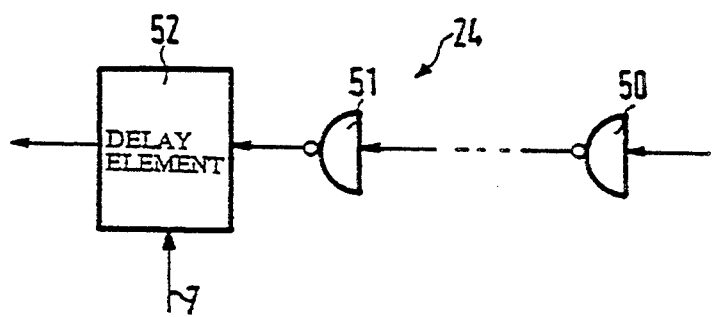
FIG. 4 is a basic schematic and block circuit diagram of a delay circuit included in the configuration of FIG. 2.

An embodiment of the delay element 24 is shown in FIG. 4. The total delay time is composed of a fixed delay time and an adjustable delay time. The fixed delay time is effected by a series connection of circuit elements, each of which has a fixed signal transit time. In the exemplary embodiment of FIG. 4, this is achieved by NAND gates 50, 51. The adjustable delay time is established by way of a delay element 52, for example, which is constructed in accordance with the patent publication discussed above. Various fixed delay times can be generated through the use of different numbers of circuit elements, by which one delay path at a time is switched to be active through multiplexers and demultiplexers.

The embodiment shown in FIG. 2 refers to clock recovery from CMI signals. However, the configuration of the invention generates a rigid-phase clock signal, coupled to the data frequency of the digital signal, from all digital signals. For instance, if the input signal at the input 5 is also a clock signal, then the configuration can be used for frequency multiplication. A further possible use is to generate a clock signal from a trigger signal, and to use the clock signal to control a digital signal processing device as a function of the trigger signal, for instance in measurement work done with an oscilloscope. In that case a delay device 24 as in FIG. 4 that has a fixed delay component, which is additionally switchable through multiplexers or demultiplexers, is especially advantageous, because the frequency of the clock signal to be generated may be within a wide range.

We claim:

1. A circuit configuration for generating a clock signal from a digital signal by evaluating signal edges of the digital signal, comprising:
   a) first means for generating a pulse at a signal edge oriented in a first direction, and second means for generating a pulse at a signal edge oriented in a second direction being opposite the first direction, each of said first and second means having one terminal for receiving the digital signal and one output;
   b) a voltage-controlled, triggerable oscillator device having at least two trigger inputs, one control input and one output, each of the trigger inputs being connected to the output of a respective one of said first and second means, and the output of said oscillator device being an output for the clock signal; and
   c) an integration device having an input connected to the output of said oscillator device and having an output connected to the control input of said oscillator device.

2. The circuit configuration according to claim 1, wherein each of said first and second means include one D flip-flop having an output being fed back to a reset input, a clock input being connected to the terminal for the digital signal and a data input being controlled by a logical level, and one of said first and second means having an inverter connected between the clock input and the terminal for the digital signal.

3. The circuit configuration according to claim 2, wherein said oscillator device is a ring oscillator including a delay device having an adjustable delay time and having an output being fed back inverted to an input, and said ring oscillator includes a NOR gate having an output being connected to the input of said delay device and to the output of said oscillator device and having inputs being connected to the output of said delay device and to the trigger inputs of said oscillator device.

4. The circuit configuration according to claim 3, wherein said delay device includes a series circuit of at least one delay element having a fixed delay time and at least one delay element having the adjustable delay time.

5. The circuit configuration according to claim 1, wherein said oscillator device is a ring oscillator including a delay device having an adjustable delay time and having an output being fed back inverted to an input, and said ring oscillator includes a NOR gate having an output being connected to the input of said delay device and to the output of said oscillator device and having inputs being connected to the output of said delay device and to the trigger inputs of said oscillator device.

6. The circuit configuration according to claim 5, wherein said delay device includes a series circuit of at least one delay element having a fixed delay time and at least one delay element having the adjustable delay time.

7. The circuit configuration according to claim 1, including a divider device having an input connected to the output of said oscillator device and an output for a divided clock output of the clock signal being the output of said oscillator device.

8. The circuit configuration according to claim 7, wherein said divider device has a reset input connected to the output of one of said first and second means.

9. The circuit configuration according to claim 1, wherein said integration device includes an up-down counter having a control input for a switchover between up and down counting being connected to the output for the clock signal and having an output, and said integration device includes a digital/analog converter being connected downstream of the output of said counter and having an output being the output of said integration device.

* * * * *